United States Patent [19] [11] 4,061,582
Moschovis et al. [45] Dec. 6, 1977

[54] RESINOUS PIGMENT TONER AND LIQUID DEVELOPER CONTAINING POLYVINYL ACETATE COATED ON THE PIGMENT

[75] Inventors: Elias P. Moschovis; John L. Gilson, both of Morton Grove, Ill.

[73] Assignee: A. B. Dick Company, Niles, Ill.

[21] Appl. No.: 625,754

[22] Filed: Oct. 24, 1975

[51] Int. Cl.[2] .......................... G03G 9/08; G03G 9/12; C08J 3/20

[52] U.S. Cl. ................................ 252/62.1 L; 101/451; 106/2; 252/62.1 R; 260/42.54; 260/42.55; 427/220; 427/221

[58] Field of Search ..................... 252/62.1 L, 62.1 R; 101/451; 106/2; 260/42.54, 42.55; 427/220, 221

[56] References Cited

U.S. PATENT DOCUMENTS

| | | | |
|---|---|---|---|
| 2,890,174 | 6/1959 | Mayer | 252/62.1 L |
| 3,417,019 | 12/1968 | Beyer | 252/62.1 L |
| 3,793,234 | 2/1974 | Ormsbee | 252/62.1 |
| 3,939,087 | 1/1976 | Vijayendran et al. | 252/62.1 L |

*Primary Examiner*—Mayer Weinblatt
*Assistant Examiner*—John D. Smith
*Attorney, Agent, or Firm*—McDougall, Hersh & Scott

[57] ABSTRACT

A liquid developer for producing an ink receptive, water repellent, oleophilic image suitable for use in the production of multiple copies by lithographic technique wherein the toner employed in the developer composition has precipitated thereon the polyvinyl acetate binder component.

9 Claims, No Drawings

RESINOUS PIGMENT TONER AND LIQUID DEVELOPER CONTAINING POLYVINYL ACETATE COATED ON THE PIGMENT

This invention relates to the production of multiple copies from an offset master imaged by electrophotographic technique and it relates more particularly to a liquid developer used in the development of the formed latent electrostatic image to produce an ink receptive, water repellent, oleophilic imaged portion with an ink repellent, water receptive, hydrophilic background whereby multiple copies can be produced by lithographic technique.

Masters suitable for imaging by electrophotographic technique are fabricated of a base sheet of metal, plastic, paper and the like flexible support, having a coating of a photoconductive material such as a photoconductive zinc oxide bonded with a resinous binder for the development of a latent electrostatic image by the well known electrostatic technique.

In this process, the photoconductive coating is given an overall electrostatic charge, while being protected from light. Thereafter, the charged surface is exposed to a light pattern of the subject to be reproduced. The electrostatic charge on the coating is dissipated in the areas struck by light and retained in the unexposed areas thereby to define a latent electrostatic reproduction of the optical image. This latent electrostatic image can then be developed by a developer composition containing toner particles which are attracted to the electrostatic image in a "positive" toning process, or to the background area in a "negative" toning process.

In the process known as the "A. B. Dick Videograph Process", described in U.S. Pat. No. 2,996,573, and U.S. Pat. No. 3,075,859, a latent electrostatic image is inscribed by conductive elements extending through the face of a cathode ray tube for deposition directly onto a dielectric coating on the surface of a base sheet or other highly electrically conductive material. The formed latent electrostatic image is developed by a developer, as previously described.

When such imaged surfaces are developed with a developer formulated to contain an ink receptive, water repellent, oleophilic toner, the image that is developed becomes ink receptive, water repellent and oleophilic, However, by reason of the presence of an organic binder in the coating, the background or non-imaged areas are generally not sufficiently ink repellent, water receptive, and hydrophilic to provide the desired balance for use as an imaged lithographic master from which multiple copies of good quality can be produced by lithographic technique.

In U.S. Pat. No. 3,793,234, description is made of a liquid developer composition formulated with a liquid aliphatic organic solvent having a resistivity greater than $10^{10}$ ohms-cm, as the liquid carrier; electrostatically attractive pigment particles of carbon black and a nigrosine dye dispersed in the liquid carrier; a rosin or rosin derivative; a dispersant in the form of a methylmethacrylate polymer which operates to maintain the pigment particles in the dispersed state in the liquid carrier, and a binder in the form of a resinous polymer.

It has been found that developer compositions of the type heretofore employed are sometimes unstable in that sedimentation occurs on standing thereby to render the developer incapable of subsequent use for the production of ink receptive, water repellent, oleophilic images having sufficient ink density for the production of copy of good quality, when the imaged plate is subsequently used to produce multiple copies by lithographic techniques.

It has also been found that multiple treatments of the imaged plate with conversion solution, or over-conversion, prior to the use of the imaged plate for the production of copies, causes blinding of the image with the result that pick up is delayed until after a number of copies have been run off and image density is relatively weak.

Thus, it is an object of this invention to produce a liquid developer for use in the preparation of electrophotographic masters in which the liquid developer is characterized by greater stability; the oleophilic properties of the developed image are improved; ink pick up is advanced to enable production of copies of good quality from almost the first copy, and in which multiple conversions or over-conversion do not undesirably affect image density or cause blinding of the image, whereby copy of good quality can be produced from the imaged master from the beginning to the end of its use in multiple copy production.

The concept of this invention resides in the use of polyvinyl acetate as a binder and the precipitation of the polyvinyl acetate onto the pigment particles, such as carbon black or nigrosinated carbon black, to provide the resinous component as an integral part of the pigment. This not only minimizes the need to mill the pigment particles in the liquid carrier for dispersion but it provides a practical and versatile means for quantitative resinating of the pigment. The developer formed of the resinated pigment particles is very stable and the oleophilic properties of the toner are greatly improved. This is effective to minimize the blinding of the image heretofore experienced from multiple conversions or over-conversion while increasing the oleophilicity of the formed image whereby ink pick up is more rapid and image density is increased.

The amount of polyvinyl acetate precipitated onto the pigment particles to form the toner may range from 0.25 to 5 times the amount of pigment particles and preferably an amount within the ratio of one part by weight pigment particles to 0.5 to 2.5 parts by weight of polyvinyl acetate resin.

While the concentration of toner in the developer is not critical, it is desirable to formulate the liquid developer with the toner formed of the polyvinyl acetate precipitated onto the pigment particles in an amount within the range of 1 to 10% by weight of the toner concentrate or 0.00002 to 0.05% by weight of the developer, as used in the development of the latent electrostatic image.

The invention will be illustrated by the following examples:

EXAMPLE 1

Preparation of resinated pigment:

| % by weight | Ingredient |
|---|---|
| 20 | Polyvinyl acetate (Gelva V-1.5, Monsanto Chemical Co. |
| 20 | Nigrosinated carbon black |
| 60 | Ethyl alcohol |

EXAMPLE 2

| % by weight | Ingredient |
|---|---|
| 15.2 | Polyvinyl acetate (VINAC RP-521 - Air Products and Chemicals, Inc.) |
| 15.2 | Nigrosinated carbon black |
| 69.2 | Acetone |

The nigrosinated carbon black is prepared as described in U.S. Pat. No. 3,749,760 to contain 24 to 35% by weight nigrosine dye and 67 to 76% by weight carbon black.

Procedure:

The polyvinyl acetate is dissolved in the ethyl alcohol (in Example 1)or the acetone (in Example 2). Solution is made in a sealed glass jar and rolled on a roller mill overnight.

The nigrosinated carbon black is added slowly to the polyvinyl acetate solution with vigorous stirring and stirring is continued for 30 minutes after addition. This is followed by dispersion in a Premier Dispersator, Type DD, marketed by Premier Mill Corporation of Geneva, N.Y.

100 grams of this dispersion is added slowly to 100 cc of cold water with continuous stirring for one hour, with the dispersator continued running at a speed sufficient to create a good vortex. The polyvinyl acetate precipitated on the nigrosinated carbon black was separated by filtration through a Buchener funnel until hard and the dampened precipitate was spread on filter paper to dry overnight. A yield of 92.4% resinated pigment was obtained.

EXAMPLE 3

Grind Composition:

| % by weight | Ingredient |
|---|---|
| 26.0 | Resinated pigments of Examples 1 or 2 |
| 0.8 | Alkali Blue R (American Cyanamid) |
| 53.5 | Hercolyn D (Hercules Chemical Company) |
| 12.6 | Fuel oil additive #2 |

The materials are thoroughly mixed and then milled on a water cooled three-roll mill, with three passes at 350 psi and four passes at 400 psi. Instead of milling on a roller mill, the grind composition can be processed in a ball mill, using steel balls or ceramic balls as the grinding medium.

EXAMPLE 4

Toner Concentrate:

| % by weight | Ingredient |
|---|---|
| 42.0 | Grind composition of Example 3 |
| 7.0 | Paraffin oil #11 (Standard Oil of Indiana) |
| 0.5 | Pliolite VTL (Goodyear Rubber Company) |
| 0.4 | Aromatic 100 (Exxon Co., U.S.A.) |
| 50.1 | Isopar G (Exxon Co., U.S.A.) |

The above were combined and dispersed for 5 minutes with a Premier Dispersator (Type DD) marketed by Premier Mill Corporation of Geneva, N.Y. Other devices, such as an attrition mill, high speed mixer and the like can be used for intimate dispersion.

EXAMPLE 5

Developer Composition:

For use in the development of a latent electrostatic image, the concentrate of Example 4 is diluted with Isopar G in the ratio of 6.5 ml of concentrate per liter of Isopar G.

After the developed plate has been dried and prior to mounting onto the offset press for the production of multiple copies by lithographic technique, the imaged surface of the plate is treated with a conversion solution such as described in U.S. Pat. No. 3,661,598, or as represented by the following conversion solution composition.

8.0% by weight ammonium dihydrogen phosphate
2.0% by weight potassium ferrocyanide
1.0% by weight potassium sulfite
0.1% by weight disodium ethylene diamine tetraacetate
88.9% by weight deionized water The pH of the solution is adjusted to 4.5 at 25° C, with phosphoric acid.

The resulting masters were run on an offset duplicator after single and multiple treatment with the conversion solution. The resulting copy was of good quanity. A good dense image was produced from practically the first copy to the end of the run (500 copies), indicating rapid ink pick up and a proper balance between the oleophilic image and the hydrophilic background.

The Hercolyn D is a hydrogenated methyl ester of rosin which is marketed by Hercules Chemical Company. A wide variety of rosins and rosin derivatives can be used to replace all or part of the Hercolyn D in Example 3 . Included are tall oils of rosin as well as their ester and hydrogenated ester derivative. This material serves, at least in part, to disperse the pigment or toner particles in the developer composition. In addition it serves as a charge directing agent and partial fixing agent by forming a thin film which anchors the pigment particles to the surface of the photoconductive coating. The amount of rosin or rosin derivative present in the concentrate may range from 10–40% by weight and preferably 28–38% by weight. In the final liquid developer, the concentration of rosin or derivative will range between 0.02 to 0.08% by weight of the developer composition.

Fuel oil additive No. 2 is a mixture of 50% by weight methacrylate polymer and 50% by weight kerosene. This material acts as a dispersant or restrainer in order to insure that the toner particles remain in suspension in the concentrate and in the developer composition. As a result, the toner will not tend to settle out, thereby to avoid tailing and agglomeration. Instead of fuel oil additive, use may be made of metal fatty acid soaps such as calcuim stearate and the like. When employed, the dispersant or restrainer is employed in an amount within the range of 0.1 to 10% by weight and preferably 3 to 7% by weight of the concentrate and 0.00002 to 0.02% be weight in the developer composition.

The paraffin oil No. 11 represents a paraffinic oil which operates to produce blacker copy and serves also to minimize settling of the pigment particles in the toner compositions. Instead of a paraffinic oil, use can be made of a naphthenic mineral oil. When present, the oil component is generally employed in an amount up to 10% by weight of the toner concentrate and up to about 0.02% by weight of the developer composition.

Alkali Blue R is a powder marketed by American Cyanamid Company. The material is frequently used as a toning agent to improve the color of the image. Other toning agents, preferably a flushed blue color or an alkali blue, can be used instead of Alkali Blue R in Example 3 since they have been found to aid in providing a cleaner background and a denser image.

Isopar G is an aliphatic solvent marketed by the Exxon Co., U.S.A. having a flash point of 104° F and a KB value of about 27. It is desirable to make use of an aliphatic solvent in formulating the toner concentrate and the developer composition in order to maintain the pigment or toner particles in dispersion. Aliphatic solvents which are used for this purpose should have a high volume resistivity in excess of $10^{10}$ ohm-cm, so as to avoid dissipation of the charge from the electrostatic image. Such aliphatic solvent serves also to avoid attack on the binder in the photoconductive coating.

Pliolite VTL is a modified polyvinyl toluene resin, marketed by Goodyear Rubber Company. Various binders, such as polyvinyl acetate, polyvinyl acetate copolymers, polyvinyl chloride, polystyrene, styrene-butadiene copolymers, alkyd and modified alkyd resins may be used instead of Pliolite VTL in Example 4. The binder component may be employed in the developer composition in an amount within the range of 0.00001 to 0.05% by weight.

Further improvement in the oleophilic character of the imaged portion, with corresponding improvement in image density and life of the imaged plate, independent of the number of conversions or over-conversion, is obtained by addition to the liquid developer composition of an amine derivative, as described in our copending application filed concurrently herewith and entitled "Liquid Developer for Electrophotographic Offset Masters". As the amine derivative added to the developer composition of this invention, as represented in Example 5, use can be made of an aliphatic amine having 3 to 18 carbon atoms in the aliphatic group, a fatty acid amine, an aromatic amine and/or a heterocyclic amine. Suitable amines may be illustrated by the following:

1. a fatty acid amine;
2. aliphatic amines in which the aliphatic group has from 3 to 18 carbon atoms;
3. aromatic amines;
4. heterocyclic amines;

such as:

bis(2-hydroxyethyl1) cocoamine oxide (Aromox DM16T)
coconut - acetic acid salts of n-alkyl amines (Armac C)
tallow - acetic acid salts of n-alkyl amines (Armac T)
octylamine (Armeen 8)
tallowamine (Armeen T)
N-tallowtrimethylene diamine diacetate (Duomac T)
tertiary amines - ethylene oxide condensation products (Ethomeen C-12)
N-butylamine
N-propylamine
N-hexylamine
octylamine
dodecylamine
methoxypropylamine
di-N-propylamine
aniline
morpholine
N-ethyl morpholine
N-methyl morpholine When the developer composition of this invention is formulated to contain an amine derivative of the type described, as by addition to the developer composition in Example 5, the amine derivative is added in an amount to make up 0.0018 to 0.03 and preferably 0.003 to 0.015% by weight of the developer composition.

The characteristics of the developer can be still further improved by formulating the developer composition to include a hydrophobic colloidal silica in the ratio of 1 part by weight colloidal silica to 1.5 to 4 parts by weight of the resinous binder and preferably 1 part by weight of the hydrophobic colloidal silica to 2 to 3 parts by weight of the binder component.

Representative of the hydrophobic colloidal silicas which may be used in the practice of this invention is QUSO — WR 50, marketed by the Philadelphia Quarts Company. The above is merely illustrative of hydrophobic colloidal silica since other hydrophobic colloidal silicas well known to the industry can be used as the colloidal silica component in the practice of this invention.

The hydrophobic colloidal silica is added to the grind composition in the desired ratio to the resinated pigment. By way of illustration, the hydrophobic colloidal silica (QUSO — WR 50 of Philadelphia Quartz Company) is added to the grind composition of Example 3 in an amount to make up 7% by weight of the grind composition.

It will be understood that changes may be made in the details of formulation and operation without departing from the spirit of the invention, especially as defined in the following claims.

We claim:

1. A liquid developer for use in providing an ink receptive, water repellent, oleophilic lithographic image suitable for use in the production of multiple copies by lithographic (offset) technique, wherein the developer is formulated of a liquid organic solvent having a resistivity greater than $10^{10}$ ohm-cm, a toner formed of oleophilic pigment particles, and a polyvinyl acetate resinous binder, the improvement wherein the polyvinyl acetate resinous binder is present as a coating precipitated onto the surfaces of the pigment particles prior to incorporation in the liquid developer as a toner and which includes in addition a hydrophobic colloidal silica present in the ratio of 1 part by weight of the hydrophobic colloidal silica to 1.5 to 4 parts by weight of the toner formed of the polyvinyl acetate resin precipitated on the pigment particles.

2. A liquid developer as claimed in claim 1 in which the hydrophobic colloidal silica is present in the ratio of 1 part by weight of the hydrophobic colloidal silica to 2 to 3 parts by weight of the toner formed of the polyvinyl acetate resin precipitated on the pigment particles.

3. A liquid developer for use in providing an ink receptive, water repellent, oleophilic lithographic image suitable for use in the production of multiple copies by lithographic (offset) technique, wherein the developer is formulated of a liquid organic solvent having a resistivity greater than $10^{10}$ ohm-cm, a toner formed of oleophilic pigment particles, and a polyvinyl acetate resinous binder, the improvement wherein the polyvinyl acetate resinous binder is present as a coating precipitated onto the surfaces of the pigment particles prior to incorporation in the liquid developer as a toner which includes an amine derivative selected from the group consisting of an aliphatic amine containing 3 to 18 carbon atoms in the aliphatic group, an aromatic amine, and a heterocyclic amine, in which the amine derivative is present in an amount within the range of 0.0018 to 0.03% by weight of the developer composition, and a hydrophobic colloidal silica present in the ratio of 1 part by weight of the hydrophobic colloidal silica to 1.5 to 4 parts by weight of the toner formed of the polvinyl acetate resin precipitated on the pigment particles.

4. A liquid developer as claimed in claim 3 in which the hydrophobic colloidal silica is present in the ratio of 1 part by weight of the hydrophobic colloidal silica to 2 to 3 parts by weight of the toner formed of the polyvinyl acetate resin precipitated in the pigment particles.

5. The preparation of a toner for liquid developers in which polyvinyl acetate resin is precipitated onto oleophilic pigment particles comprising dissolving the polyvinyl acetate resin in an organic solvent, dispersing the pigment particles into the solution of the polyvinyl acetate resin, adding the dispersion with mixing to water whereby the polyvinyl acetate precipitates out onto the pigment particles, and then separating the resinated pigment from the liquid.

6. The preparation as claimed in claim 5 in which the pigment particles are formulated of carbon black and a nigrosine dye.

7. The preparation as claimed in claim 5 in which the polyvinyl acetate resin is dissolved in an alcohol.

8. The preparation as claimed in claim 5 in which the polyvinyl acetate resin is dissolved in a ketone.

9. The preparation as claimed in claim 8 in which the ketone is acetone.

* * * * *